(12) United States Patent
Bent et al.

(10) Patent No.: US 10,990,474 B1
(45) Date of Patent: Apr. 27, 2021

(54) COST-BENEFIT AWARE READ-AMPLIFICATION IN RAID SCRUBBING

(71) Applicant: Seagate Technology LLC, Cupertino, CA (US)

(72) Inventors: John Bent, Los Alamos, NM (US); Kenneth K. Claffey, Danville, CA (US); Ian Davies, Longmont, CO (US); Peter Maddocks, Windsor, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/811,790

(22) Filed: Mar. 6, 2020

(51) Int. Cl.
| G06F 11/10 | (2006.01) |
| G06F 11/07 | (2006.01) |
| G06F 11/30 | (2006.01) |

(52) U.S. Cl.
CPC ........ *G06F 11/106* (2013.01); *G06F 11/0757* (2013.01); *G06F 11/1076* (2013.01); *G06F 11/3034* (2013.01)

(58) Field of Classification Search
CPC ............... G06F 11/106; G06F 11/0757; G06F 11/1076; G06F 11/3034
See application file for complete search history.

(56) References Cited

U.S. PATENT DOCUMENTS

| 7,573,773 | B2 | 8/2009 | Lin | |
| 8,452,911 | B2 | 5/2013 | Gorobets et al. | |
| 9,053,808 | B2 | 6/2015 | Sprouse et al. | |
| 9,262,266 | B2 | 2/2016 | Choi et al. | |
| 9,612,908 | B2 | 4/2017 | Kim et al. | |
| 10,310,989 | B2 | 6/2019 | Hillier et al. | |
| 10,430,279 | B1 * | 10/2019 | Dittia | G06F 3/0688 |
| 10,452,289 | B1 * | 10/2019 | Colgrove | G06F 11/1076 |
| 2016/0306574 | A1 * | 10/2016 | Friedman | G06F 3/0638 |
| 2016/0308968 | A1 * | 10/2016 | Friedman | H04L 29/08072 |
| 2016/0366226 | A1 * | 12/2016 | Friedman | G06F 3/0608 |
| 2018/0088856 | A1 * | 3/2018 | Yu | G06F 3/0604 |
| 2019/0050284 | A1 * | 2/2019 | Brown | G06F 12/0246 |
| 2019/0102320 | A1 | 4/2019 | Hillier et al. | |
| 2019/0122744 | A1 * | 4/2019 | Alzheimer | G11C 29/028 |
| 2019/0161341 | A1 * | 5/2019 | Howe | B81B 7/0087 |
| 2019/0179552 | A1 * | 6/2019 | Moon | G11C 7/1018 |
| 2019/0179560 | A1 * | 6/2019 | Moon | G11C 7/1018 |

OTHER PUBLICATIONS

"Evaluating the Impact of Undetected Disk Errors in RAID Systems" by Rozier et al., published in 2009 IEEE/IFIP International Conference on Dependable Systems & Networks, conference held Jun. 29-Jul. 2, 2009.

* cited by examiner

*Primary Examiner* — Kyle Vallecillo
(74) *Attorney, Agent, or Firm* — Westman, Champlin & Koehler, P.A.

(57) ABSTRACT

A method includes, upon a read operation for a stripe of a storage device, determining a percentage amount of potential read amplification for the read operation. A current age of the stripe in the read operation is determined as a percentage of a longest safe elapsed time between read scrub operations on a stripe of the storage device. A read scrub operation is performed on the stripe when the current age is greater than the percentage amount of potential read amplification.

20 Claims, 4 Drawing Sheets

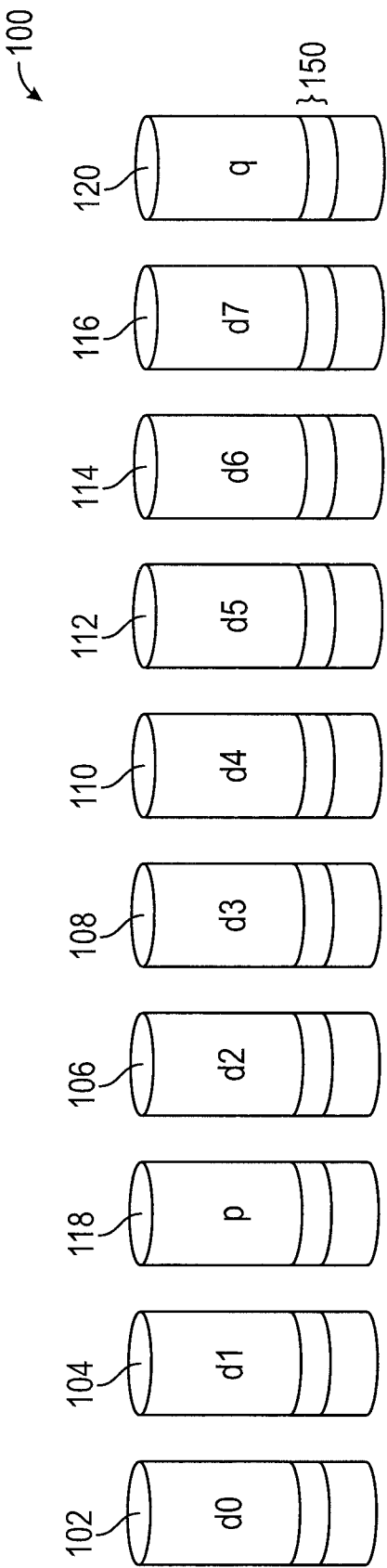
FIG. 1
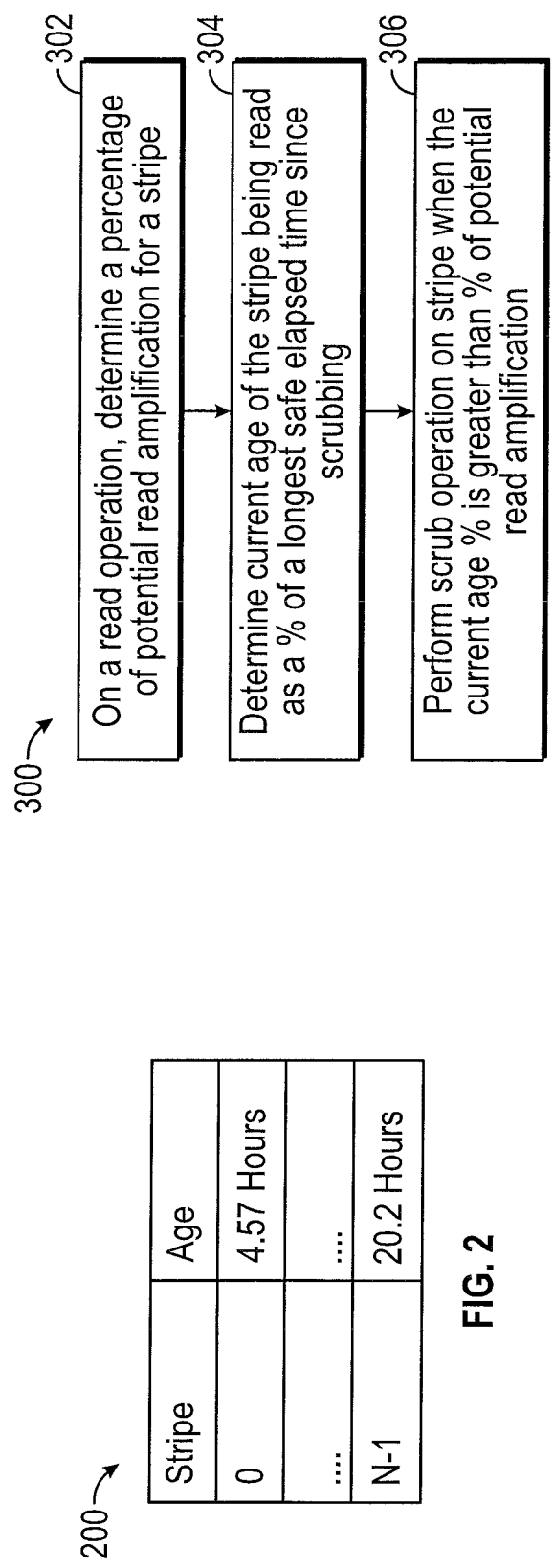
FIG. 2
FIG. 3

COST-BENEFIT AWARE READ-AMPLIFICATION IN RAID SCRUBBING

SUMMARY

In one embodiment, a method includes, upon a read operation for a stripe of a storage device, determining a percentage amount of potential read amplification for the read operation. A current age of the stripe in the read operation is determined as a percentage of a longest safe elapsed time between read scrub operations on a stripe of the storage device. A read scrub operation is performed on the stripe when the current age is greater than the percentage amount of potential read amplification.

In another embodiment, a method includes striping a plurality of data storage disks and at least one parity disk in a system, and maintaining an age of each of a plurality of zones, each zone comprising a plurality of stripes. Upon a read operation for a stripe of the system, a percentage amount of potential read amplification for the read operation on the stripe is determined. A current age of the zone containing the stripe in the read operation is determined as a percentage of a longest safe elapsed time between read scrub operations on a zone of the storage device. A read scrub operation is performed on the stripe when the current age is greater than the percentage amount of potential read amplification.

In another embodiment, a storage system includes a plurality of disks having a first portion of data storage disks and a second portion of parity disks, the plurality of disks having a striped data configuration, and a controller configured to perform read scrubbing on the plurality of disks. The controller is configured to, upon a read operation for a stripe of the plurality of disks, determine a percentage amount of potential read amplification for the read operation, determine a current age of the stripe in the read operation as a percentage of a longest safe elapsed time since a read scrub operation on the stripe, and perform a read scrub operation on the stripe when the current age is greater than the percentage amount of potential read amplification.

This summary is not intended to describe each disclosed embodiment or every implementation of dynamic read scrubbing in a data storage device as described herein. Many other novel advantages, features, and relationships will become apparent as this description proceeds. The figures and the description that follow more particularly exemplify illustrative embodiments.

BRIEF DESCRIPTION OF THE DRAWINGS

FIG. 1 is a block diagram of a storage device physical architecture on which embodiments of the present disclosure may be used;

FIG. 2 is an exemplary table of values used according to an embodiment of the present disclosure;

FIG. 3 is a flow diagram of a method according to another embodiment of the present disclosure;

DETAILED DESCRIPTION OF ILLUSTRATIVE EMBODIMENTS

Figure 4:
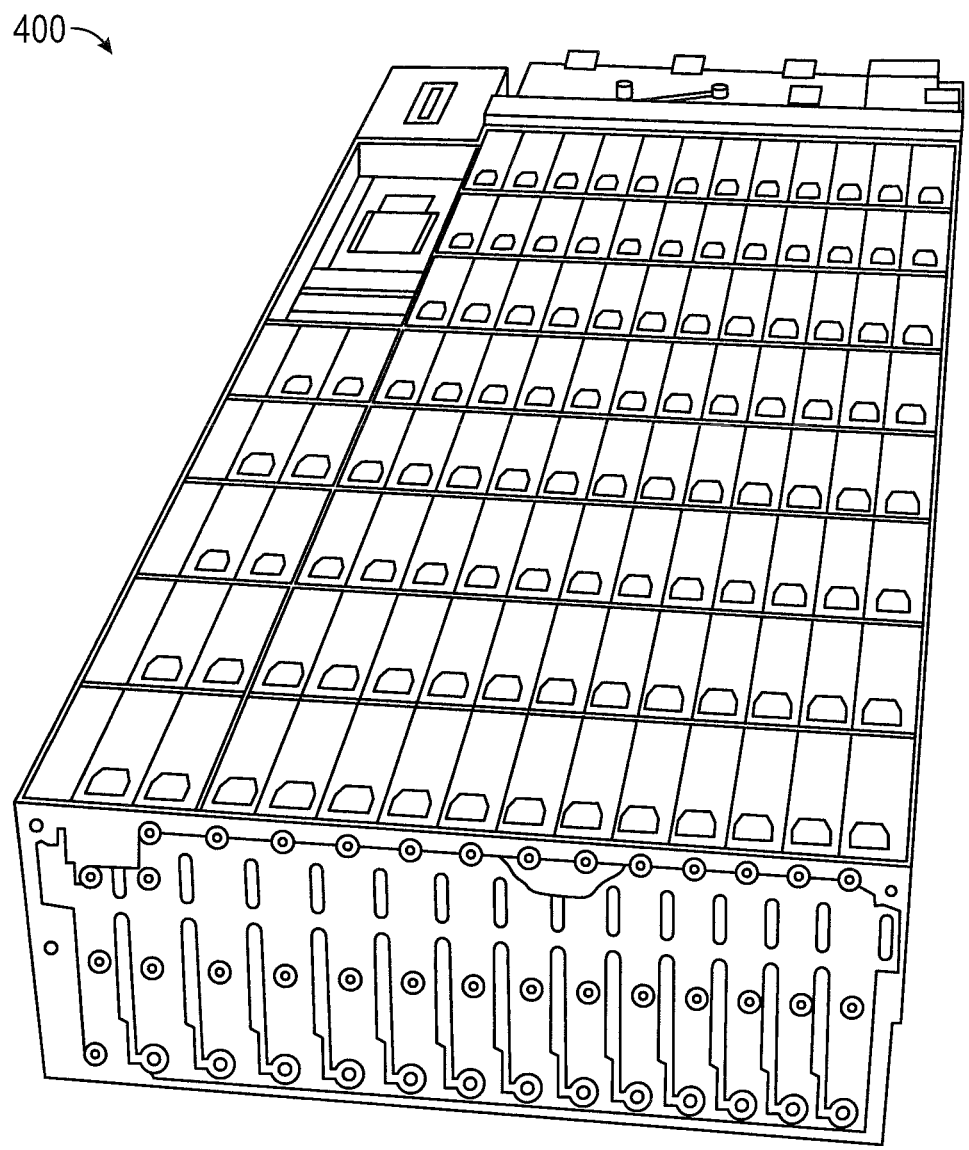
FIG. 4 is a perspective view of an array of disks on which embodiments of the present disclosure may be used.

Embodiments of the present disclosure provide a method of improving read scrubbing and scheduling using a dynamic operation to determine when a read scrub should be performed on a stripe in a striped storage system.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

In a storage system with striping and parity, read amplification can become a problem, especially if small amounts of data are being read that do not extend over substantially all of a stripe, or are only for one disk within a stripe. Further, even a small potential for errors that go unrecognized increases with the large amounts of data being stored in modern systems. Background scrubbing has therefore become increasingly important. However, with all of the system requirements for larger data sets, scrubbing priorities have been moved further behind other system operations. Doing a full stripe parity check on every read, which has been performed using a system of stripe parity error assessment on reads (SPEAR), has become problematic from a scheduling and resource standpoint.

Operations in a storage system such as a striped random array of inexpensive (or independent) disks (RAID) system having multiple storage disks and multiple parity disks are performed in foreground operations and background operations. Foreground operations deal with user- or host-initiated read and write commands, and the like. Users expect that a read request to a system will be handled quickly and efficiently. Background operations are performed to keep such a system available, operational, and efficient. Background operations include, by way of example and not by way of limitation, data scrubbing, fail rebuild, and the like.

At any one moment in time, a RAID system is performing both foreground and background operations. In the foreground, the system is responding to immediate requests from users, such as storing a new file, reading data from the system, etc. At the same time, a RAID system also performs background work, including all the operations that makes sure the system is ready for foreground work. For example, when a drive fails, background operations rebuild all the drive data. Scrubbing is also traditionally performed in the background. Referring to FIG. 1, a RAID system is shown with eight data storage disks d0, d1, . . . , d7, and two parity disks p and q. With such a system, on ten disks there are eight chunks of data and two chunks of parity within each stripe. If any two of the disks fail, the surviving eight may be used to restore lost data. In many instances, failures are immediate and obvious, such as a full disk failure.

Stored data is also susceptible to silent data corruption. Silent data corruption includes small data errors that are not necessarily immediate and obvious, such as the failure of a drive within a system. In many cases, errors are silent or not as easily detected. Instead of a full disk failure, some portion of a disk may fail, and this is not immediately obvious. For example, if some portion of a stripe in the d3 block goes bad, and a portion of a stripe in the d0 block goes bad, such data corruption may not be immediately obvious. Then, an obvious immediate failure of another disk prompts an attempt at rebuilding the stripe, only to discover the bad blocks of d0 and d3. At this point, since three blocks are bad, the data for the stripe is lost.

To protect against such a silent loss of data, periodic background scrubbing is performed in such systems. In background scrubbing, stripes are checked periodically, so that if d0 silently goes bad, it can be repaired in scrubbing before an obvious immediate disk failure. The probability of silent data corruption is mostly constant on a per-byte basis. However, the total amount of stored data is rising exponentially. This means that the probability of any lost byte is also rising exponentially.

Most existing systems employ some form of background scrubbing. Two ways to perform background scrubbing include using an interleaved data integrity field (DIF) using a T10-DIF protocol, or full stripe scrubbing. In T10-DIF, The DIF associated with a disk block is read and used to check whether the block is still valid. In full stripe scrubbing, a full stripe is read from the RAID system, and RAID parity is checked. In both cases, if there is a mismatch, the correct data can be recomputed from the RAID parity.

As the size of data sets continues to increase, the amount of background scrubbing becomes larger and can perturb performance. Ideally, scrubbing only happens in the background, but during busy periods when a system does not have much down time, it can be difficult to find time for scrubbing. When scrubbing is deferred for too long, it eventually runs at a higher priority. This can perturb foreground traffic. Further, rebuild activity, after the discovery of data corruption, has also become more prevalent with larger HDD sizes and with larger total data sets. Rebuild activity will also run at a higher priority than scrubbing, thereby further decreasing the ability of RAID systems to effectively run scrubbing.

In order for a system to have an acceptable amount of reliability and data durability, scrubbing of data to identify and correct errors is performed on a schedule to ensure that all stripes of data are scrubbed periodically. A maximum time between scrubbing will depend on the system, and can be determined based on a determined failure model to assess a longest safe elapsed time between scrubs.

A SPEAR approach as discussed above ensures that scrubbing occurs. However, such an approach is a brute force method that scrubs a stripe each and every time data is read from the stripe. This occurs whether the entire stripe is to be read, or whether a single piece of data off of one disk in the stripe is read, and is performed regardless of whether the stripe has just been scrubbed or not. Therefore, a SPEAR approach can be problematic especially for read operations that tend to be small, which leads to a large amount of read amplification. This is increasingly important with artificial intelligence (AI) and machine learning areas where small reads are more likely.

Read amplification occurs when only a small portion of a stripe is to be read. For example, when there are eight storage elements d0 . . . d7 and two parity elements p and q, a read of data on only one of the devices, for example d5, could lead to a scrub with previous options even though it is not needed. Such a scrub is unnecessary and time consuming if the rest of the stripe is not in need of a scrub. However, if it has been a long time since a scrub operation has occurred on the stripe, the amplification may be worthwhile.

Processes of the present disclosure determine when to amplify a foreground read operation to incorporate read scrubbing with a foreground read operation. Specifically, embodiments of the present disclosure set a time frame during which read amplification decisions are made on a RAID stripe at the time of a read to that stripe. Some embodiments maintain a table or file of the age of each stripe in a system, where the age is the elapsed time since the stripe has been scrubbed. Using a determined failure model to assess a longest safe elapsed time between scrubs, when a read enters the system, at that time, the scrubber determines, based on the potential read amplification for the stripe being read and the percentage of the longest elapsed time the stripe has reached, whether a scrubbing operation is to be performed. When the age percentage of the stripe exceeds the amplification percentage, a scrub operation is performed.

Referring again to FIG. 1, a read scrubbing method according to an embodiment of the present disclosure is discussed. FIG. 1 shows a RAID array 100 where data is stored in stripes. RAID array 100 contains eight storage disks d0 . . . d7 (labeled, respectively, 102, 104, 106, 108, 110, 112, 114, and 116) and two parity disks p and q (labeled, respectively, 118 and 120). A RAID stripe 150 along the storage and parity disks is shown. Stripe 150 contains eight data blocks and a p and a q parity block.

A table 200 is shown in FIG. 2. The table 200 is for purposes of example only. If each storage device (the eight data storage disks and the two parity disks) has N stripes (of which stripe 150 is one), the table 200 identifies, in one embodiment, each stripe, and its age. The age of a stripe is the elapsed time since that stripe has been scrubbed.

A method of read scrubbing is shown in block diagram form in FIG. 3. Method 300 comprises, in one embodiment, upon a read operation for a stripe of a storage device, determining a percentage amount of potential read amplification (RA) for the read operation in block 302. In block 304, a current age (CA) of the stripe in the read operation is determined as a percentage of a longest safe elapsed time since a read scrub operation on the stripe. A read scrub operation is performed on the stripe, in block 306, when the current age is greater than the percentage amount of potential read amplification.

A current age of the stripe being read as a percentage of a longest safe elapsed time is determined as follows. The table of FIG. 2 is an example of a table that is maintained to store an age of each stripe within the RAID array 100 (or within a system of RAID arrays), where the age is an elapsed time since each stripe has been scrubbed. This is compared in one embodiment to the determined longest safe elapsed time between scrubs. The CA is a ratio of the stripe age to the longest safe elapsed time between scrubs. Expressed as a decimal, a CA of 0.5 occurs when the elapsed time since the stripe has been scrubbed is half of the longest safe elapsed time between scrubs. That is, CA=(age of current stripe)/(longest safe elapsed time between scrubs).

A percentage of read amplification is determined as follows. An amplification percentage depends on the total number of storage disks in the stripe, the number of parity disks in the stripe, and the number of disks that are to be read in the stripe in a current read operation. That is, an amplification percentage is the percentage amount of read amplification that would be used to do a full stripe scrub given the current read request. Expressed as a formula, the read amplification percentage RA is equal to the number of storage disks (D) plus the number of parity disks (P) minus the read width (R) in number of storage disks to be read, all divided by the total number of disks in the stripe (D+P).

That is, $RA=(D+P-R)/(D+P)$.

Taking the array 100 of disks of FIG. 1 as an example, D=8, P=2. The table 200 of FIG. 2 has ages for stripes 0, 1, . . . , N−1. Presume that the longest safe elapsed time between scrubs is 24 hours. Therefore, when a read on stripe 0 is requested, the CA of stripe 0 is the age of stripe 0 since its last scrub (4.57 hours) divided by the longest safe elapsed time between scrubs (24 hours), or 4.57/24=0.1904 (19.04%).

If a read request for stripe 0 requests a read covering four of the data storage disks, then $RA=(8+2-4)/(8+2)=0.60$ (60%). A comparison between 0.1904 and 0.60 is made. In this case, the CA is less than the percentage amount of RA. No scrubbing is performed. It may be seen in this example that for eight data storage disks and two parity disks, even a read of all eight data storage chunks in a stripes will not trigger a read scrub, since the read amplification is 20% ((8+2-8)/(8+2)).

In another example for the same array 100 and table 200, a read on stripe N−1 is requested. In this example, the CA of stripe N−1 is the age of stripe N−1 since its last scrub (20.2 hours) divided by the longest safe elapsed time between scrubs (24 hours), or 20.2/24=0.8417 (84.17%).

If a read request for stripe N−1 requests a read covering four of the data storage disks, then $RA=(8+2-4)/(8+2)=0.60$ (60%). A comparison between 0.8417 and 0.60 is made. In this case, the current age CA is greater than the percentage amount of read amplification RA. Read scrubbing is performed. In this situation, read scrubbing is done by amplification of the read to read the entire stripe, data storage and parity chunks, and to perform read scrubbing in a combination of foreground and background operations. The table 200 is updated to reset the age of stripe N−1. It may be seen in this example that for eight data storage disks and two parity disks, any read of two or more data storage chunks in a stripe will trigger a read scrub, since the RA for a read of two chunks is 80% ((8+2−2)/(8+2)). While eight data storage disks and two parity disks are shown, it should be understood that the numbers of such disks are not limited to that configuration, and that other configurations with more or fewer data storage disks and/or parity disks are within the scope of the embodiments of the present disclosure.

The dynamic determination of whether to scrub a stripe may be performed at every read operation for each stripe. That is, the map of table 200 for determining the CA of each stripe within a system uses the age of a stripe from the table compared to the longest safe elapsed time between scrubs. Whenever a read enters the system 100, the amount of amplification RA that would be used to amplify the read into a scrubbing operation is determined. If the CA is greater than the RA, a scrub is performed.

In order to ensure that all stripes are scrubbed within the longest safe elapsed time between scrubs, a background scrubbing operation is still performed. In one embodiment, a background scrubber reads the map of FIG. 2, and sets a timer for the moment when the oldest current stripe will hit the longest elapsed time. At that time, even if it has not been activated with a RA versus CA read, the scrubber is activated, and at that time, scrubs all stripes in the system that need scrubbing. This ensures that no stripe will go unscrubbed for longer than the longest safe elapsed time between scrubs. The scrubber, when awoken, may not actually have any scrubbing to perform because of the embodiments of the disclosure.

The dynamic nature of the embodiments of the present disclosure improves scrubbing by determining at each stripe read whether an amount of potential read amplification for the stripe is warranted based on how long it has been since the stripe has been scrubbed. The embodiments of the present disclosure piggyback scrubbing onto stripe reads when an amount of potential read amplification is determined to be acceptable. While a CA greater than the RA has been discussed as the criteria for doing a read amplification and read scrubbing on a read, it should be understood that the criteria may be changed without departing from the scope of the present disclosure.

In a physical hardware system, large numbers of disks may be assembled, for example, four rack units with 106 drives (typically called a 4u106 configuration, using a RAIDed (or reliable) bunch of disks (RBOD). An RBOD with 4u106, in addition to 106 drives in racks, has other hardware such as but not limited to central processing units (CPUs), networking, and adds its own parity configurations to restore lost data when a drive or drives fail. Such an RBOD is amenable to use with embodiments of the present disclosure.

Further, a series of RBOD solutions may be joined together into an object store system that works over a user-friendly interface. Embodiments of the present disclosure are also amenable to use with such a system.

The table 200 discussed above with respect to FIG. 2 contains age data for each stripe of a system such as system 100. As system size and sheer amount of data increases, the amount of metadata that may be used to keep track of the age of every stripe in a system may become unwieldy.

Metadata is the extra information a system maintains, for example, to know where data is, information about the data, etc. With such large amounts of data, there can be large amounts of metadata that are maintained, such as inside an RBOD. Maintaining an age for each stripe in a large system can overwhelm bookkeeping and background operations of a system, or use more storage than is desired.

In one embodiment, the table 200 of FIG. 2 is maintained, but with a group of stripes instead of each stripe. In one embodiment, each group of stripes forms a zone. A number of stripes per zone may be chosen by a user to configure how much read scrubbing is done by maintaining an age of each zone of stripes as opposed to the age of each stripe. For example, a zone is a certain number of stripes. Data is maintained for each zone in any number of ways, such as the oldest stripe in the zone, an average age of the stripes in the zone, or the like. A smallest zone, then, would be one stripe per zone. Larger zones could have two, ten, a thousand, or more stripes.

The fewer stripes per zone, the more benefit to data reliability, but a larger amount of metadata and potential performance reduction due to the large amount of data. The more stripes per zone, the less benefit to data reliability, but a smaller amount of metadata and potential. Embodiments of the present disclosure therefore allow for tuning the number of stripes per zone, and/or the percentages at which read scrubbing on stripe read is performed, to tune costs and benefits of the various configurations.

An example RBOD 400 is shown in perspective view in FIG. 4. Such an RBOD 400 is amenable to use with embodiments of the present disclosure. RBOD 400 is an example of a 4u106 configuration of disks, such as an Exos™ E 4U106 I RBOD by Seagate*.

Figure 5:
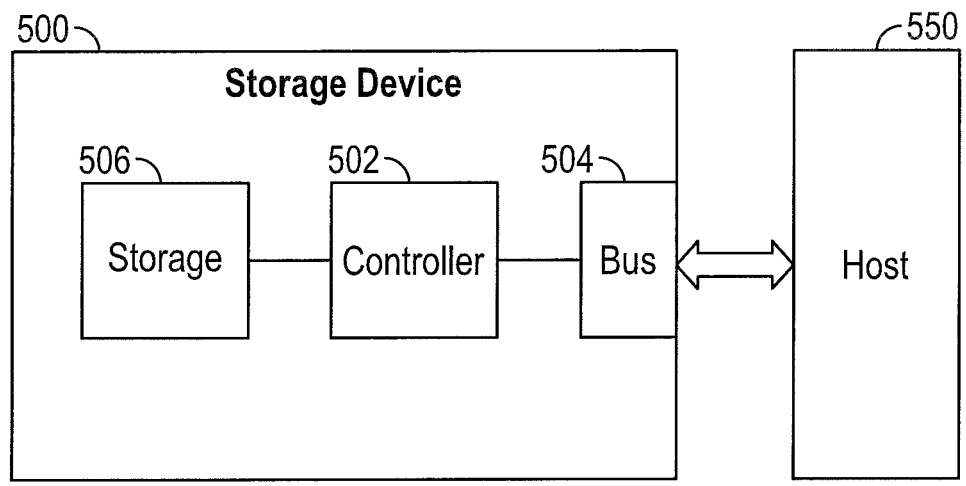
FIG. 5 is a block diagram of a data storage device on which embodiments of the present disclosure may be used.

Storage system drives 500 such as those shown in FIG. 5 may be used in RBOD 400 or other enclosures or systems of disks in a RAID configuration. Storage system 500 may be a solid state drive including non-volatile memory and associated controllers such as are known in the art; or any other storage system for persistent storage of information. System 500 may include, by way of example, a controller 502 coupleable via a bus 504 or the like to a host system 550, where the host system 550 may provide power over the bus 504 or through a separate power bus (not shown), and a storage component 506 (such as nonvolatile memory). Dynamic read scrubbing may be performed on an array of group configuration of disks 500 according to the methods described herein.

Figure 6:
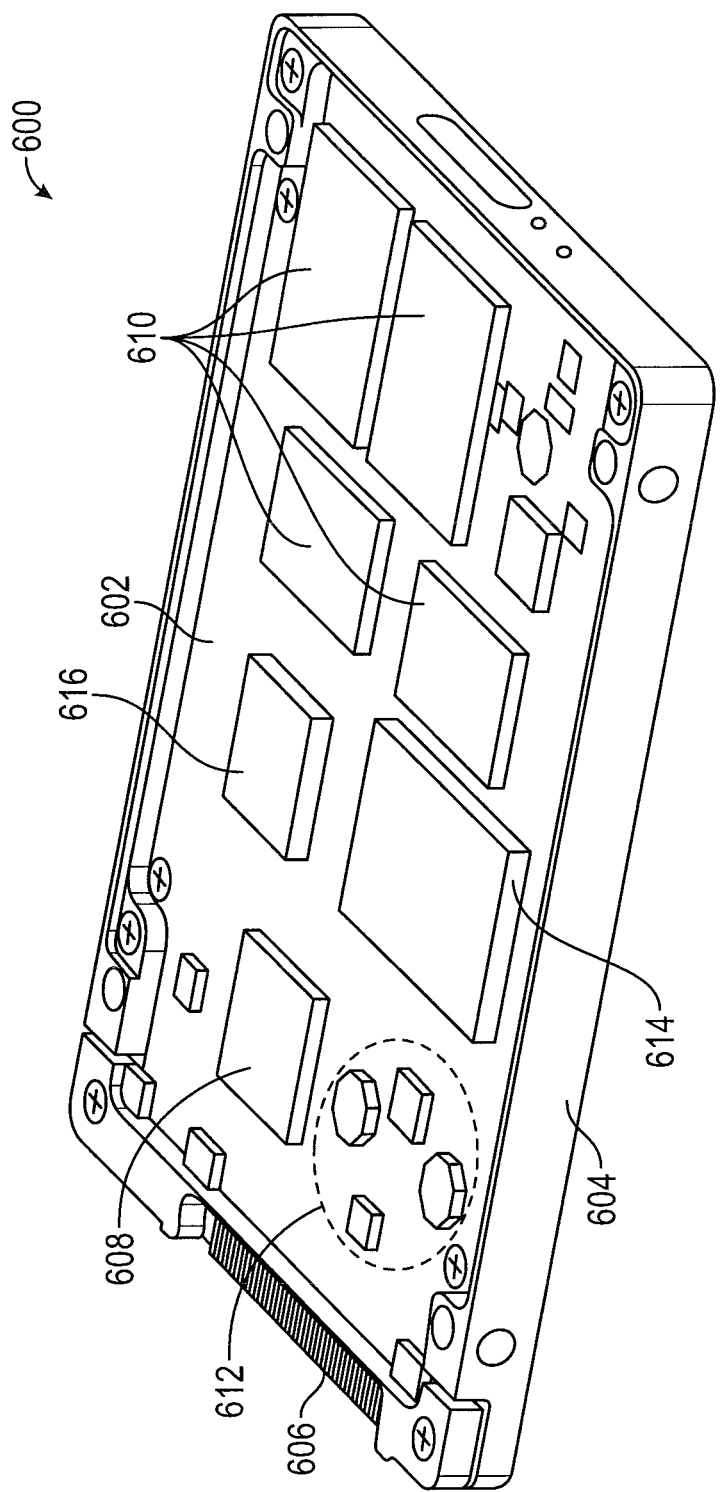
FIG. 6 is an oblique view of a solid state drive (SSD) on which embodiments of the present disclosure may be used.

Storage system drives 600 such as those shown in FIG. 6 may be used in RBOD 400 or other enclosures or systems of disks in a RAID configuration. FIG. 6 illustrates an oblique view of a solid state drive (SSD) 600 in accordance with a system embodying the methods described herein may be used. SSD 600 includes one or more printed circuit boards (PCBs) or circuit card assemblies 602 and typically includes a protective, supportive housing 604, and one or more interface connectors 606. SSD 600 further includes a controller application specific integrated circuit (ASIC) 608 or field programmable gate array (FPGA), one or more non-volatile memory devices 610, and power regulation circuitry 612. The memory devices 610 are essentially the SSD's data storage media. SSD 600 may include erasure blocks as the physical storage locations within memory device 610, which may include Flash memory devices, for example. In some applications, SSD 600 further includes a power-backup energy storage device, such as a super-capacitor 614.

In accordance with certain aspects, the SSD 600 includes the circuit card assembly 602 that includes a connector 606 for connection to a host computer (not shown). In accordance with certain aspects, the connector 606 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer. Dynamic read scrubbing in an array of such disks 600 may be performed according to the methods described herein, with instructions and metadata stored on separate disks of the system, on the controller 608, or in a separate memory controller for memory devices 610.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
   upon a read operation for a stripe of a storage device:
   determining a percentage amount of potential read amplification for the read operation;
   determining a current age of the stripe in the read operation as a percentage of a longest safe elapsed time between read scrub operations on a stripe of the storage device; and
   performing a read scrub operation on the stripe when the current age is greater than the percentage amount of potential read amplification.

2. The method of claim 1, wherein determining a percentage amount of potential read amplification comprises determining a number of chunks of the stripe that are not being read as a percentage of a total number of disks in the stripe.

3. The method of claim 2, wherein the percentage amount of potential read amplification is determined to be equal to a number of storage disks plus a number of parity disks minus a read width in number of storage disks to be read, all divided by the total number of disks in the stripe.

4. The method of claim 1, wherein determining a current age for a stripe being read comprises:
   obtaining an age since the stripe being read has been scrubbed; and
   dividing the obtained age since the stripe being read has been scrubbed by the longest safe elapsed between read scrub operations.

5. The method of claim 1, wherein determining a current age for a stripe being read comprises:
   obtaining an age since a zone of stripes containing the stripe has been scrubbed; and
   dividing the obtained age since the stripe being read has been scrubbed by the longest safe elapsed between read scrub operations.

6. The method of claim 5, wherein obtaining an age since a zone of stripes containing the stripe has been scrubbed comprises determining an average age since scrubbing for all of the stripes in the zone.

7. The method of claim 5, wherein obtaining an age since a zone of stripes containing the stripe has been scrubbed comprises determining an oldest age since scrubbing for all of the stripes in the zone.

8. The method of claim 1, and further comprising:
   maintaining a timer for when an oldest current stripe in the storage device will reach the longest safe elapsed time since a read scrub operation; and
   initiating a scrub operation when the timer for the oldest current stripe in the storage device reaches the longest safe elapsed time since a read scrub operation.

9. A method, comprising:
   striping a plurality of data storage disks and at least one parity disk in a system;
   maintaining an age of each of a plurality of zones, each zone comprising a plurality of stripes; and
   upon a read operation for a stripe of the system:
   determining a percentage amount of potential read amplification for the read operation on the stripe;
   determining a current age of the zone containing the stripe in the read operation as a percentage of a longest safe elapsed time between read scrub operations on a zone of a storage device; and
   performing a read scrub operation on the stripe when the current age is greater than the percentage amount of potential read amplification.

10. The method of claim 9, wherein determining a percentage amount of potential read amplification comprises determining a number of chunks of the stripe that are not being read as a percentage of a total number of data storage disks and parity disks in the stripe.

11. The method of claim 10, wherein the percentage amount of potential read amplification is determined to be equal to a number of storage disks plus a number of parity disks minus a read width in number of storage disks to be read, all divided by the total number of disks in the stripe.

12. The method of claim 9, wherein determining a current age for a stripe being read comprises:
obtaining an age since the zone of stripes containing the stripe has been scrubbed; and
dividing the obtained age since the stripe being read has been scrubbed by the longest safe elapsed between read scrub operations.

13. The method of claim 9, wherein obtaining an age since a zone of stripes containing the stripe has been scrubbed comprises determining an average age since scrubbing for all of the stripes in the zone.

14. The method of claim 12, wherein obtaining an age since a zone of stripes containing the stripe has been scrubbed comprises determining an oldest age since scrubbing for all of the stripes in the zone.

15. The method of claim 9, and further comprising:
maintaining a timer for when an oldest current zone in the storage device will reach the longest safe elapsed time since a read scrub operation; and
initiating a scrub operation when the timer for the oldest current zone in the storage device reaches the longest safe elapsed time since a read scrub operation.

16. A storage system, comprising:
a plurality of disks having a first portion of data storage disks and a second portion of parity disks, the plurality of disks having a striped data configuration; and
a controller configured to, upon a read operation for a stripe of the plurality of disks:
determine a percentage amount of potential read amplification for the read operation;
determine a current age of the stripe in the read operation as a percentage of a longest safe elapsed time since a read scrub operation on the stripe; and
perform a read scrub operation on the stripe when the current age is greater than the percentage amount of potential read amplification.

17. The storage system of claim 16, wherein the plurality of disks comprises a RAID array.

18. The storage system of claim 16, wherein the plurality of disks are housed in a rack mount system.

19. The storage system of claim 16, wherein the controller is further configured to determine a percentage amount of potential read amplification by determining a number of chunks of the stripe that are not being read as a percentage of a total number of disks in the stripe.

20. The storage system of claim 17, wherein the controller is further configured to determine a current age for a stripe being read by obtaining an age since a zone of stripes containing the stripe has been scrubbed, and dividing the obtained age since the stripe being read has been scrubbed by the longest safe elapsed between read scrub operations.

* * * * *